(12) United States Patent
Kim et al.

(10) Patent No.: US 7,628,527 B2
(45) Date of Patent: Dec. 8, 2009

(54) BACK LIGHT UNIT HAVING LIGHT GUIDE BUFFER PLATE

(75) Inventors: Do Hun Kim, Seoul (KR); Myoung Soo Choi, Seoul (KR); Choul Ho Lee, Gyunggi-do (KR); Seog Ho Lim, Gyunggi-do (KR); Sung Min Yang, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 214 days.

(21) Appl. No.: 11/987,301

(22) Filed: Nov. 29, 2007

(65) Prior Publication Data
US 2008/0137374 A1 Jun. 12, 2008

(30) Foreign Application Priority Data
Dec. 11, 2006 (KR) ............... 10-2006-0125415

(51) Int. Cl.
*F21V 7/04* (2006.01)
*F21V 8/00* (2006.01)
*G02B 6/10* (2006.01)

(52) U.S. Cl. .............. 362/621; 362/608; 362/612; 362/623; 362/626; 385/146

(58) Field of Classification Search .......... 362/608, 362/612, 621, 626, 623; 385/146
See application file for complete search history.

(56) References Cited
U.S. PATENT DOCUMENTS
6,086,212 A * 7/2000 Onishi et al. ............. 362/621

6,497,492 B1 * 12/2002 Benoit et al. ............. 362/19
6,805,468 B2 * 10/2004 Itoh et al. ............... 362/362
6,979,095 B2 * 12/2005 Min et al. ............... 362/611
7,206,491 B2 * 4/2007 Feng et al. .............. 385/146
7,217,025 B2 * 5/2007 Kim et al. ............... 362/610

FOREIGN PATENT DOCUMENTS
JP 2003-297126 10/2003

* cited by examiner

*Primary Examiner*—Stephen F Husar
*Assistant Examiner*—James W Cranson
(74) *Attorney, Agent, or Firm*—McDermott Will & Emery LLP

(57) ABSTRACT

There is provided a back light unit having a light guide buffer plate. The back light unit having a light guide buffer plate includes a light source for generating the light when a power source is applied; a light guide panel whose light-receiving vertical surface that the light emitted from the light source enters is provided with a first prism pattern and whose bottom surface is provided with a refraction pattern, thereby converting the incident light from the light-receiving vertical surface into a surface light source; a reflection unit disposed in a bottom surface of the light guide panel to reflect light toward the light guide panel; and a buffer disposed between the light source and the light guide panel and whose light-emitting vertical surface corresponding to the light-receiving vertical surface of the light guide panel is provided with a second prism pattern. The back light unit can be useful to improve visibility, a mixing property and uniformity by basically removing a poor-visibility zone, which is formed in an end of the light guide panel, without any changes in the structure of the light guide panel.

11 Claims, 5 Drawing Sheets

BACK LIGHT UNIT HAVING LIGHT GUIDE BUFFER PLATE

CROSS-REFERENCE TO RELATED APPLICATIONS

This application claims the priority of Korean Patent Application No. 2006-125415 filed on Dec. 11, 2006, in the Korean Intellectual Property Office, the disclosure of which is incorporated herein by reference.

BACKGROUND OF THE INVENTION

1. Field of the Invention

The present invention relates to a back light unit having a light guide buffer plate, and more particularly, to a back light unit having a light guide buffer plate capable of improving image quality by improving visibility, uniformity and luminance since the light guide buffer plate is provided between a light source and a light guide panel to get rid of a poor-visibility zone without any changes in structure of the light guide panel.

2. Description of the Related Art

In general, flat displays are mainly divided into emissive flat displays and non-emissive flat displays. Examples of the non-emissive flat displays include a liquid crystal display, and it is impossible to see an image on such a liquid crystal display in dark places since the liquid crystal display does not emit the light by itself to display an image, but uses incident light from the external environment to display an image.

Accordingly, a back light unit is installed in the rear of the liquid crystal display to illuminate the liquid crystal display with light. The back light unit has been used for surface light source apparatuses such as an illuminating sign and the like in addition to the non-emissive display such a liquid crystal display.

The back light unit is divided into a direct light type and an edge light type, depending on the configuration of the light source, the direct light type using a plurality of lamps installed right beneath the liquid crystal display to directly illuminate a liquid crystal panel, and the edge light type using a lamp installed in an edge of a light guide panel (LGP) to illuminate a liquid crystal panel with light.

The edge light-type back light unit uses a line light source and a point light source as the light source. Representative examples of the line light source include a cold cathode fluorescent lamp (CCFL) having both end electrodes installed in the inner part of a tube, and the point light source includes a light emitting diode (LED).

Here, the CCFL has advantages that it may emit intensive white light, provide high luminance and high uniformity, and make it possible to design a large back light unit. However, it has disadvantages that it is operated by a high-frequency AC signal and within the narrow temperature range. The LED has advantages that, although its performance is deteriorated in the aspect of luminance and uniformity when compared to the CCFL, it is operated by a DC signal, its life span is long, and its operation temperature range is wide. Also, the LED has advantages that it may be manufactured with a thin thickness.

And, the light guide panel used for the edge light type back light unit functions to convert incident light into a surface light and release the surface light in a vertical direction, the incident light being transmitted from a line light source or a point light source through an edge of the light guide panel. To convert incident light from the light source into a surface light, a scattering pattern or a holographic pattern is formed on the light guide panel using a printing or mechanical machining process.

FIG. 1 is a configurational view illustrating a conventional back light unit.

The conventional edge light type back light unit 1 includes a light source 10 formed as line light source or a point light source in a substrate 12; a light guide panel 20 disposed in one side of the light source to convert light into a surface light and release the converted light source toward a liquid crystal panel (not shown); and a reflecting member 30 disposed below the light source 10 and light guide panel 20 to reflect the light released from the light source, as shown in FIG. 1.

A pattern 25 is provided in a bottom surface of the light guide panel 20 facing the reflecting member 30, the pattern 25 being convexly or concavely formed to convert light into a surface light.

On the light guide panel 20 is formed an optical sheet 40 such as a diffuser sheet or a prism sheet, wherein the diffuser sheet diffuses light in various directions, the light being reflected by the reflecting member 30 and refracted in the light guide panel 20 to direct toward the liquid crystal panel (not shown), and the prism sheet plays a role in collecting the light, passed through the diffuser sheet, within the range of a front viewing angle.

For the edge light type back light unit 1 as configured thus, the light from the light source 10 is released toward an arrow A direction represented by a solid line to enter a light incidence surface 21 which is one side surface of the light guide panel 20. Then, some of the incident light from the light incidence surface 21 passes through the light guide panel 20 as shown in an arrow A1 direction, some of the incident light collides against the pattern 25 of the light guide panel 20 and the reflecting member 30 and then directs toward the optical sheet 40 as shown in an arrow A2 direction, and the remainder of the incident light collides against the optical sheet 40 and then reflects toward the pattern 25 and the reflecting member 30 as shown in an arrow A3 direction.

However, the edge light type back light unit 1 has disadvantages that the incident light converted in a vertical direction is ununiformly scattered in an end region of the light guide panel 20 that is adjacent to the light source, its luminance is poor, and a poor-visibility zone (W) in which colors are not normally mixed is formed. Therefore, the poorly mixed colors serve to deteriorate user's visibility since they are seen as spots in the display panel.

Therefore, optical luminance and uniformity are additionally deteriorated even when a light source is enhanced, a pattern processed especially in a bottom surface of the light guide panel is improved, or a structure of the light guide panel is changed for the purpose of solving the above problem regarding the visibility zone.

SUMMARY OF THE INVENTION

An aspect of the present invention provides a back light unit having a light guide buffer plate capable of improving visibility, a mixing property and uniformity by basically removing a poor-visibility zone, which is formed in an end of a light guide panel, without any changes in structure of the light guide panel.

According to another aspect of the present invention, there is provided a back light unit including a light source for generating the light when a power source is applied; a light guide panel whose light-receiving vertical surface that the light emitted from the light source enters is provided with a first prism pattern and whose bottom surface is provided with a refraction pattern, thereby converting the incident light from the light-receiving vertical surface into a surface light source; a reflection unit disposed in a bottom surface of the light guide panel to reflect light toward the light guide panel; and a buffer disposed between the light source and the light guide panel and whose light-emitting vertical surface corresponding to the light-receiving vertical surface of the light guide panel is provided with a second prism pattern.

The light source may be disposed in a disposition groove that is depressedly formed in the light-receiving vertical surface of the buffer.

The light source may be one selected from the group consisting of a point light source and a line light source.

The first prism pattern and the second prism pattern may be provided so that they are crossed to each other at a right angle.

The first prism pattern may be formed in a pleated shape with triangular sections that are horizontal to the light guide panel, and the second prism pattern may be formed in a pleated shape with triangular sections that are vertical to the light guide panel.

The first prism pattern may be formed in a pleated shape with triangular sections that are vertical to the light guide panel, and the second prism pattern may be formed in a pleated shape with triangular sections that are horizontal to the light guide panel.

The light guide panel may be provided with an auxiliary prism pattern that is formed in a vertical surface corresponding to an opposite side of the light-receiving vertical surface having the first prism pattern formed therein.

The auxiliary prism pattern may be formed in the same pleated shape as the first prism pattern.

The auxiliary prism pattern may be crossed at a right angle with the first prism pattern.

The back light unit according to the present invention may further include an optical sheet having either a prism sheet or a diffuser sheet laminatedly disposed on the light guide panel.

The back light unit according to the present invention may further include an optical sheet having a prism sheet and a diffuser sheet laminatedly disposed on the light guide panel.

BRIEF DESCRIPTION OF THE DRAWINGS

The above and other aspects, features and other advantages of the present invention will be more clearly understood from the following detailed description taken in conjunction with the accompanying drawings, in which:

FIG. 5 shows a back light unit having a light guide buffer plate according to one exemplary embodiment of the present invention, wherein:

(a) is a perspective view illustrating a buffer, (b) is a front view illustrating a buffer, and (c) is a perspective view illustrating a light guide panel.

Figure 6A:
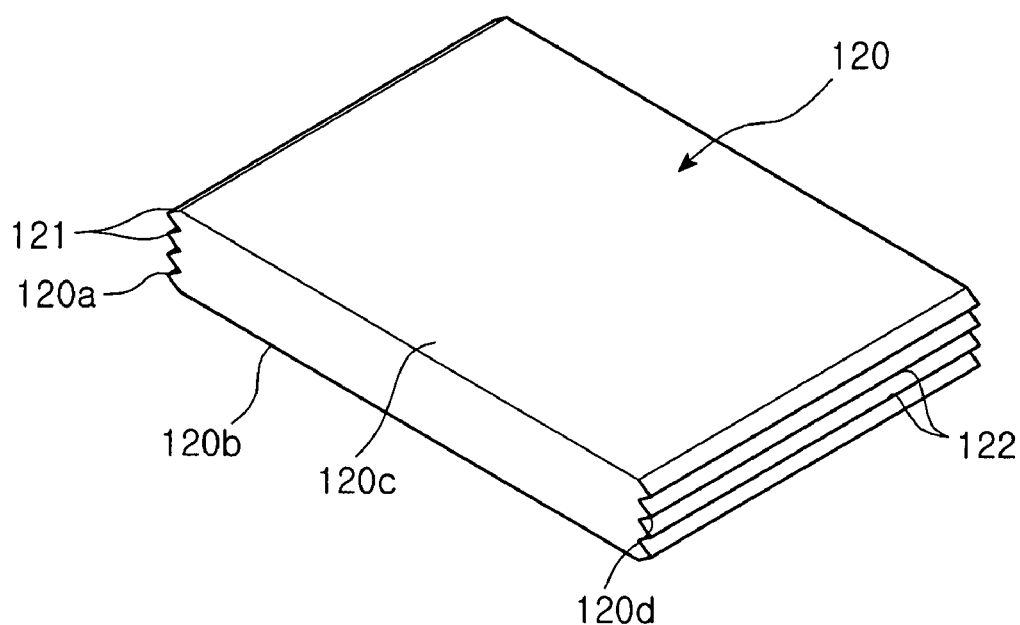
Figure 6B:
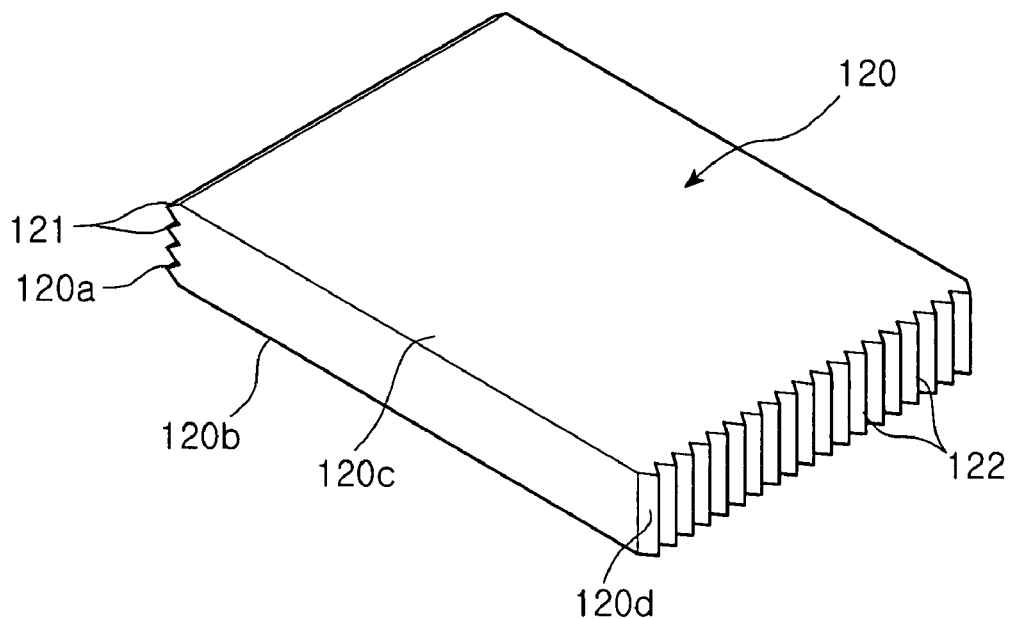

FIGS. 6 (a) (b) are diagrams illustrating another exemplary embodiment of a light guide panel used form the back light unit having a light guide buffer plate according to the present invention.

BRIEF DESCRIPTION OF MAIN PARTS IN THE DRAWINGS

| 110: | light source | 120: | light guide panel |
|---|---|---|---|
| 121: | first prism pattern | 122: | auxiliary prism pattern |
| 130: | reflection unit | 140: | buffer |
| 141: | second prism pattern | 144: | disposition groove |
| 150: | optical sheet | W: | poor-visibility zone |

DETAILED DESCRIPTION OF THE PREFERRED EMBODIMENT

Exemplary embodiments of the present invention will now be described in detail with reference to the accompanying drawings.

Figure 2:
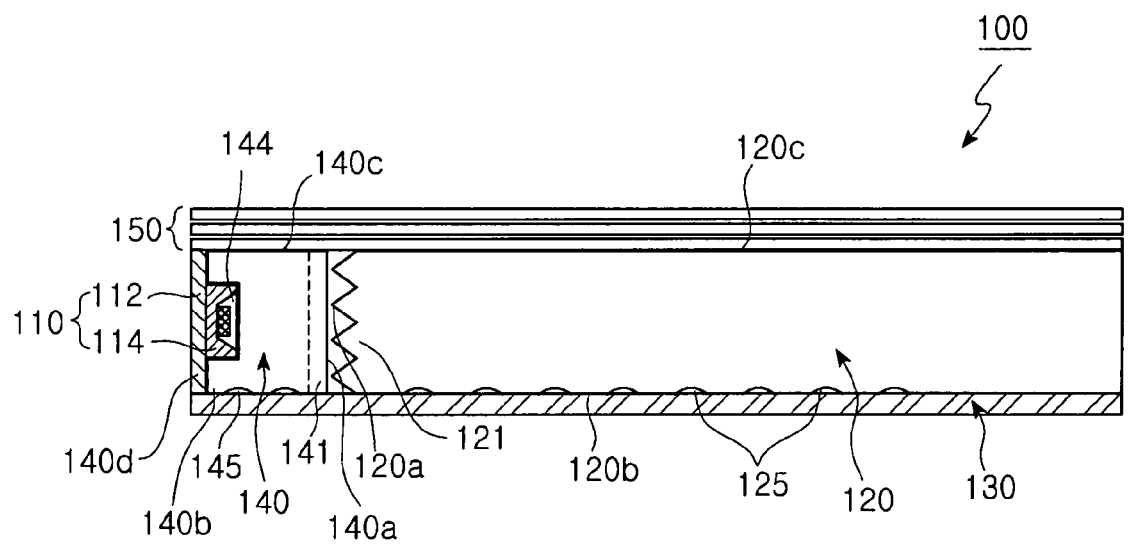
FIG. 2 is a longitudinal section view illustrating a back light unit having a light guide buffer plate according to one exemplary embodiment of the present invention.
Figure 3:
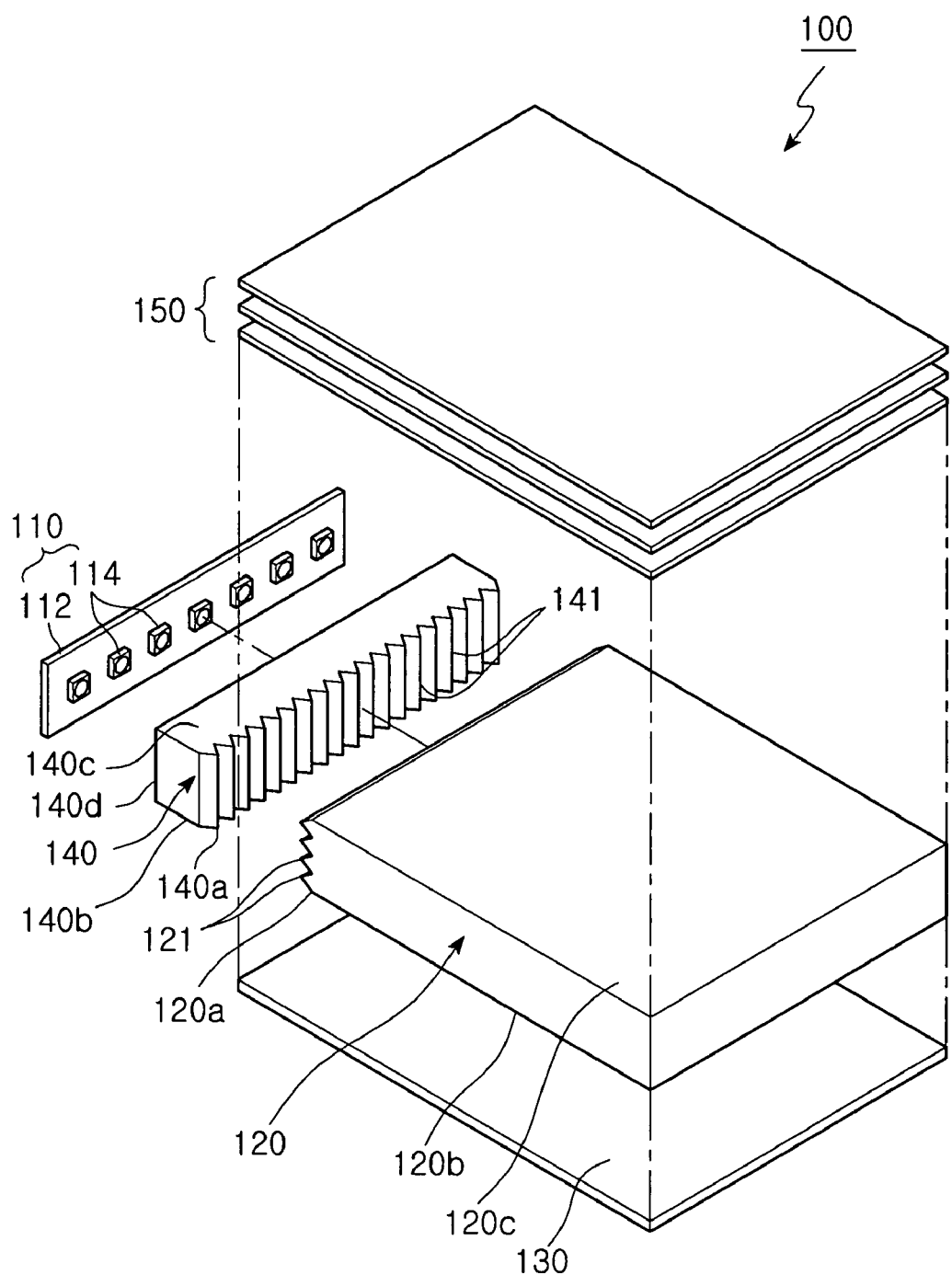
FIG. 3 is an exploded perspective view illustrating a back light unit having a light guide buffer plate according to one exemplary embodiment of the present invention.
Figure 4:
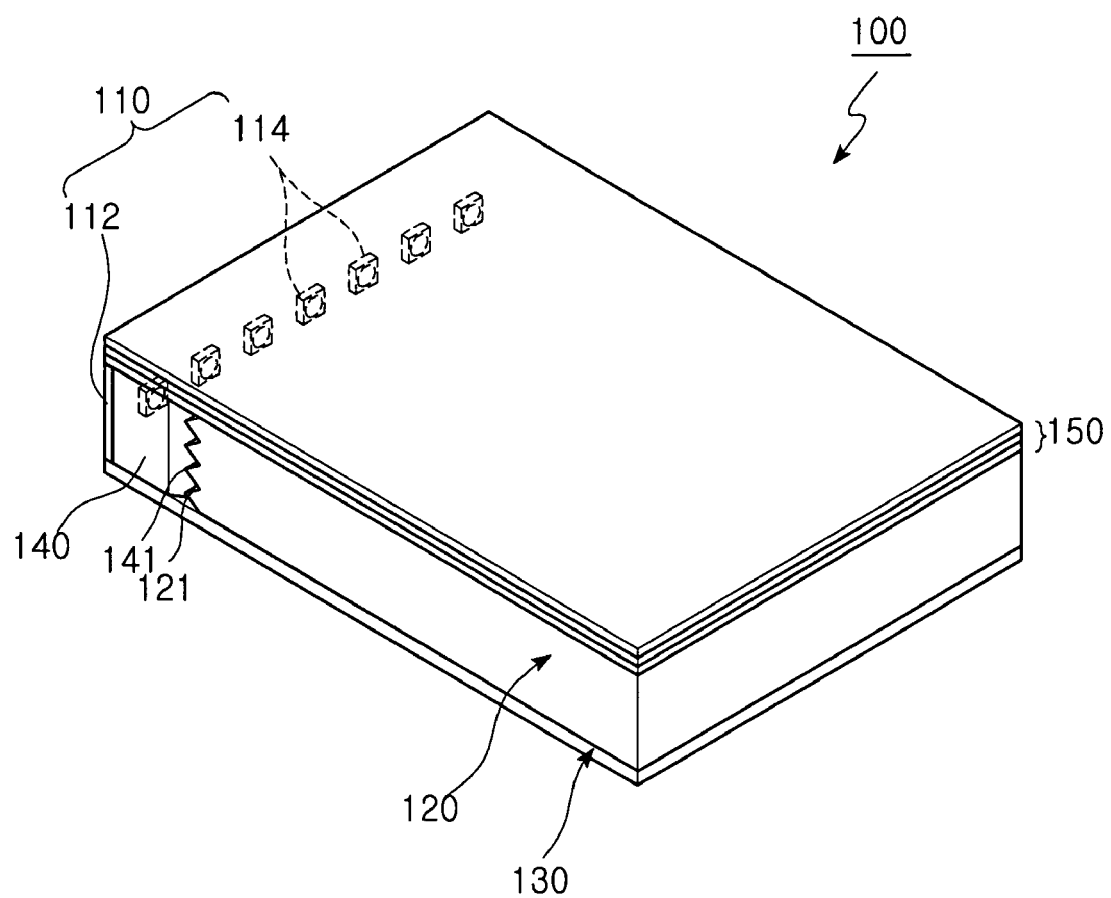
FIG. 4 is a general perspective view illustrating a back light unit having a light guide buffer plate according to one exemplary embodiment of the present invention.
Figure 5A:
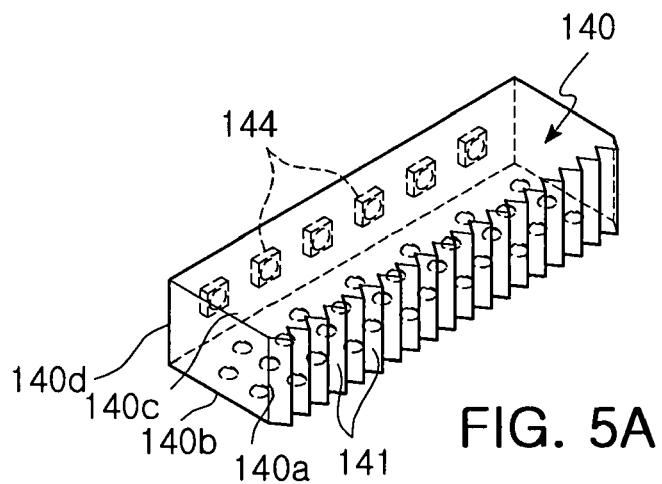
Figure 5B:
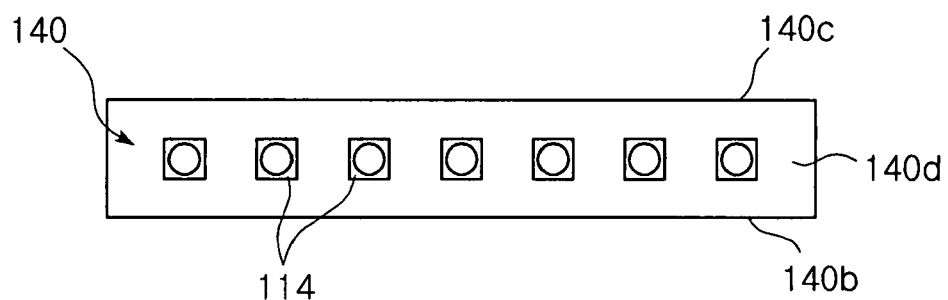
Figure 5C:
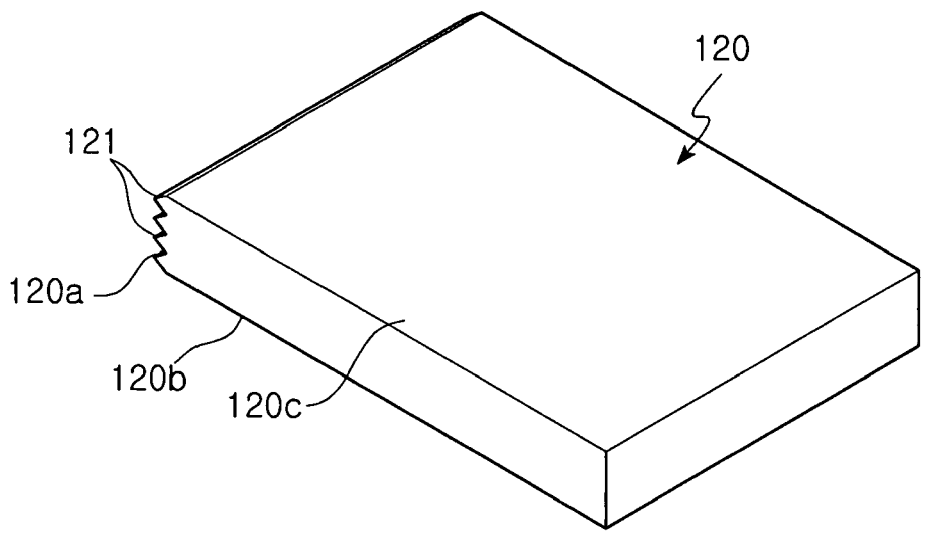

FIG. 2 is a longitudinal section view illustrating a back light unit having a light guide buffer plate according to one exemplary embodiment of the present invention, FIG. 3 is an exploded perspective view illustrating a back light unit having a light guide buffer plate according to one exemplary embodiment of the present invention, FIG. 4 is a general perspective view illustrating a back light unit having a light guide buffer plate according to one exemplary embodiment of the present invention, and FIG. 5 shows a back light unit having a light guide buffer plate according to one exemplary embodiment of the present invention, wherein: (a) is a perspective view illustrating a buffer, (b) is a front view illustrating a buffer, and (c) is a perspective view illustrating a light guide panel.

The back light unit 100 according to the present invention includes a light source 110, a light guide panel 120, a reflection unit 130 and a light guide buffer plate 140, as shown in FIGS. 2 to 5 (a) (b) (c).

The light source 110 is a light emitting unit that generates light when a power is applied. And, when a power is applied, a fluorescent lamp generating light with a line source distribution, or a light emitting diode (LED) generating light with a point source distribution may be selectively used as the light source.

In this exemplary embodiment of the present invention, it is shown and described that a plurality of LEDs 114 are electrically mounted on the substrate 112, but the present invention is not particularly limited thereto, and therefore it is also possible to use a fluorescent lamp.

The light guide panel 120 is a hexahedral structure that is made of transparent materials such as PMMA and disposed in one side of the light source 110 providing light when a power is applied to transmit the light.

The light guide panel 120 includes a first prism pattern 121 formed in a light-receiving vertical surface 120a receiving the light released from the light source 110; and a refraction pattern 125 formed in a bottom surface 120b to convert the light received from the light-receiving vertical surface 120a into a surface light and release the converted surface light toward the light-emitting top surface 120c.

A scattering pattern or a holographic pattern is formed by a printing method or mechanical processing method so that the refraction pattern 125 can convert the light incident from the light source into a surface light.

Here, it is shown and described that the refraction pattern 125 is concavely formed in the bottom surface 120b of the light guide panel 120, but the present invention is not particularly limited thereto, and therefore the refraction pattern 125 may be convexly formed in the bottom surface 120b The reflection unit 130 is disposed right bellow the light guide panel 120 and formed as reflector sheet or reflector plate with a reflective layer having a high photoreflectance so that it can reflect the light entering the bottom surface 120b of the light guide panel 120 toward the light-emitting top surface 120c of the light guide panel 120.

The buffer 140 is formed as a light guide buffer plate disposed in a space between the light source 110 and the light guide panel 120, and made of the same materials as the light guide panel 120.

The buffer 140 includes a second prism pattern 141 formed in a light-emitting vertical surface 140a corresponding to the light-receiving vertical surface 120a of the light guide panel 120; and a refraction pattern 145 formed in a bottom surface 140b to convert light into a surface light and release the converted surface light toward a light-emitting top surface 140c as in the refraction pattern 125 provided in the bottom surface 120b of the light guide panel 120.

Also, the buffer 140 includes disposition grooves 144 in which a plurality of LEDs 114 constituting the light source 110 are disposed, the disposition grooves 144 being concavely formed in the light-receiving vertical surface 140d facing the light source 110.

Meanwhile, the first prism pattern 121 provided in the light-receiving vertical surface 120a of the light guide panel 120 and the second prism pattern 141 provided in the light-emitting vertical surface 140a of the buffer 140 are formed so that the first prism pattern 121 can be crossed at a right angle with the second prism pattern 141.

Here, the first prism pattern 121 may be formed in a pleated shape with triangular sections that are horizontal to the light guide panel, and the second prism pattern 141 may be formed in a pleated shape with triangular sections that are vertical to the light guide panel, but the present invention is not particularly limited thereto. On the contrary, the first prism pattern 121 provided in the light guide panel 120 may be formed in a pleated shape with triangular sections that are vertical to the light guide panel, and the second prism pattern 141 provided in the buffer 140 may be formed in a pleated shape with triangular sections that are horizontal to the light guide panel.

Also, the light guide panel 120 may include an auxiliary prism pattern 122 formed in a vertical surface 120d that is opposite to the light-receiving vertical surface 120a having the first prism pattern 121 formed therein, as shown in FIGS. 6 (a) (b). In this case, the auxiliary prism pattern 122 may be formed in the same pleated shape as the first prism pattern 122, or formed in a pleated shape that is crossed at a right angle with that of the first prism pattern 121.

And, either a diffuser sheet and a prism sheet is preferably laminated right onto the light guide panel 120 to form an optical sheet 150 that functions to improve optical luminance, the diffuser sheet functioning to diffuse light, that is released toward a liquid crystal panel (not shown), in every direction, and the prism sheet playing a role in collecting light, which is released toward the liquid crystal panel, in the range of front viewing angles.

Also, the optical sheet 150 that functions to improve optical luminance may be formed between the light guide panel 120 and the liquid crystal panel by laminating the diffuser sheet and the prism sheet on the light guide panel 120 at the same time.

Meanwhile, when a power is applied to the light source 110 of the back light unit 100 to allow the light source 110 to emit the light, the generated light enters the light guide panel 120 through the buffer 140 disposed between the light source 110 and the light guide panel 120.

The light entering the buffer 140 and the light guide panel 120 are incident at angles of ±90 based on the optical axis that extends horizontally from the center of the light source 110. In this case, an angle of half intensity refers to an azimuth angle where a light source emits light having intensity corresponding to a half of the maximum intensity of the light, and the angle of half intensity of the light source 110 provided with LEDs is about 45 degrees.

Therefore, some of the light, which has been incident aslant upward based on the optical axis of the light source 110, is released to the light-emitting top surface 140c of the buffer 140 and the light-emitting top surface 120c of the light guide panel 120, and some of the light is reflected by the optical sheet 150 to re-enter the light guide panel 120.

Also, some of the light, which has been incident aslant downward based on the optical axis of the light source 110, is reflected by the reflection unit 130 provided in a lower surface of the buffer 140 and light guide panel 120 to re-enter the buffer 140 and the light guide panel 120. At the same time, the re-entered light is converted into a surface light, which is then released toward the light-emitting top surface 140c of the buffer 140 and the light-emitting top surface 120c of the light guide panel 120, by means of the refraction pattern 145 provided in the bottom surface 140b of the buffer 140 and the refraction pattern 125 provided in the bottom surface 120b of the light guide panel 120.

And, the light emitted from the light source 110 provided in the disposition groove 144 of the buffer 140 first enters the second prism pattern 141 provided in the light-emitting vertical surface of the buffer 140.

Since the second prism pattern 141 is formed in a pleated shape with triangular sections that are vertical to the light guide panel as shown in FIGS. 3 and 5, the incident light to the second prism pattern 141 is refracted toward left and right inclined planes of the light guide panel 120 and penetrates the light guide panel 120 while penetrating the left and right inclined planes formed in every pleated prism pattern, and the light penetrating the second prism pattern 141 is incident toward the second prism pattern 121 provided in the light-receiving vertical surface 120a of the light guide panel 120.

Subsequently, since the first prism pattern 121 is formed in a pleated shape with triangular sections that are horizontal to the light guide panel, the light incident toward the first prism pattern 111 is refracted toward upper and lower inclined planes of the light guide panel 120 and penetrates the light guide panel 120 while penetrating the upper and lower inclined planes formed in every pleated prism pattern.

Also, the light entering the buffer 140 is converted to a surface light, which is then directed right upward by the refraction pattern 145 formed in the bottom surface 140b, and then released to the light-emitting top surface 140c of the buffer 140.

In addition, some of the light, which is reflected toward the upper and lower inclined planes of the light guide panel 120 while penetrating the upper and lower inclined planes formed in every pleated prism pattern of the first prism pattern 121, is released to the light-emitting top surface 120c of light guide panel 120, and converted into a surface light, which is then released right upward by the refraction pattern 125 formed in the bottom surface 120b of the light guide panel 120, and then released toward the light-emitting top surface 120c of the light guide panel 120.

Figure 1:
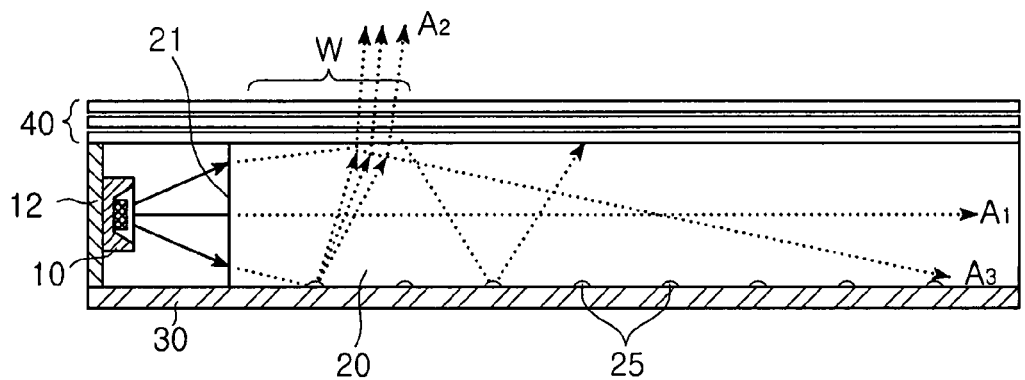
FIG. 1 is a configurational view illustrating a conventional back light unit.

In this case, the light transferred from the light source 110 to the light guide panel 120 may be transferred more effectively and uniformly, and therefore luminance of a poor-visibility zone (W) (see FIG. 1), which is formed in an end of the light guide panel 120 adjacent the light source 110, is improved, thereby maintaining roughly uniform luminance of the light released from the light-emitting top surface 120c of the light guide panel 120 and improving color uniformity.

Also, it is possible to reduce the number of the installed LEDs 114 used for the light source 110, and, thus, the manufacturing cost may be lowered by enhancing the luminance in a liquid crystal panel (not shown) and improving color uniformity without any changes in design of the light guide panel 120.

According to the present invention as described above, the light transferred from the light source to the light guide panel may be uniformly transferred to the light guide panel while penetrating the facing first and second prism sheets, by providing the first prism pattern in the light-receiving vertical surface of the light guide panel formed in one side of the light source and providing the second prism pattern in the light-emitting vertical surface of the buffer formed between the light source and the light guide panel. Accordingly, the back light unit according to the present invention may be useful to uniformly improve the entire optical luminance by improving luminance in a zone between the light source and the light guide panel, improve color uniformity, and reduce the manufacturing cost by decreasing the number of the installed LEDs mounted in the light source as many as the increased optical luminance of the light.

While the present invention has been shown and described in connection with the exemplary embodiments, it will be apparent to those skilled in the art that modifications and variations can be made without departing from the spirit and scope of the invention as defined by the appended claims.

What is claimed is:

1. A back light unit having a light guide buffer plate, comprising:
    a light source for generating the light when a power source is applied;
    a light guide panel whose light-receiving vertical surface that the light emitted from the light source enters is provided with a first prism pattern and whose bottom surface is provided with a refraction pattern, thereby converting the incident light from the light-receiving vertical surface into a surface light source;
    a reflection unit disposed in a bottom surface of the light guide panel to reflect light toward the light guide panel; and
    a buffer disposed between the light source and the light guide panel and whose light-emitting vertical surface corresponding to the light-receiving vertical surface of the light guide panel is provided with a second prism pattern.

2. The back light unit of claim 1, wherein the light source is disposed in a disposition groove that is concavely formed in the light-receiving vertical surface of the buffer.

3. The back light unit of claim 1, wherein the light source is one selected from the group consisting of a point light source and a line light source.

4. The back light unit of claim 1, wherein the first prism pattern and the second prism pattern are provided so that they are crossed to each other at a right angle.

5. The back light unit of claim 4, wherein the first prism pattern is formed in a pleated shape with triangular sections that are horizontal to the light guide panel, and the second prism pattern is formed in a pleated shape with triangular sections that are vertical to the light guide panel.

6. The back light unit of claim 4, wherein the first prism pattern is formed in a pleated shape with triangular sections that are vertical to the light guide panel, and the second prism pattern is formed in a pleated shape with triangular sections that are horizontal to the light guide panel.

7. The back light unit of claim 1, wherein the light guide panel is provided with an auxiliary prism pattern that is formed in a vertical surface corresponding to an opposite side of the light-receiving vertical surface having the first prism pattern formed therein.

8. The back light unit of claim 7, wherein the auxiliary prism pattern is formed in the same pleated shape as the first prism pattern.

9. The back light unit of claim 7, wherein the auxiliary prism pattern is crossed at a right angle with the first prism pattern.

10. The back light unit of claim 1, further comprising an optical sheet having either a prism sheet or a diffuser sheet laminatedly disposed on the light guide panel.

11. The back light unit of claim 1, further comprising an optical sheet having a prism sheet and a diffuser sheet laminatedly disposed on the light guide panel.

* * * * *